United States Patent [19]

McBroom

[11] Patent Number: 5,272,435
[45] Date of Patent: Dec. 21, 1993

[54] APPARATUS FOR TIMING AQUATIC CRAFT FOR WATER SKIING COMPETITION

[76] Inventor: Michael A. McBroom, 6710 Spray La., Rosharon, Tex. 77583

[21] Appl. No.: 916,949

[22] Filed: Jul. 20, 1992

Related U.S. Application Data

[63] Continuation-in-part of Ser. No. 743,220, Aug. 9, 1991, abandoned.

[51] Int. Cl.⁵ .............................................. G01P 3/66
[52] U.S. Cl. ...................................... 324/179; 73/490
[58] Field of Search ............... 324/160, 171, 173, 174, 324/178, 179, 207.15, 207.2, 207.16, 207.22–207.26; 73/490; 368/107

[56] References Cited

U.S. PATENT DOCUMENTS

| | | | |
|---|---|---|---|
| 4,316,253 | 2/1982 | Possémé | 324/326 |
| 4,470,013 | 9/1984 | Possémé | 324/207.26 X |
| 4,788,498 | 11/1988 | Uemura | 324/207.16 |
| 4,935,697 | 6/1990 | Paesch et al. | 324/207.15 X |
| 4,943,772 | 7/1990 | Maupu et al. | 324/207.2 |
| 5,136,621 | 8/1992 | Mitchell et al. | 324/179 X |

*Primary Examiner*—Gerard R. Strecker
*Assistant Examiner*—Warren S. Edmonds
*Attorney, Agent, or Firm*—Harrison & Egbert

[57] ABSTRACT

Apparatus and method for accurately timing speed of aquatic vehicles, particularly for water skiing competition and the like. Floating magnetic generating transmitters are placed under one or more linearly aligned buoys configured to accommodate an aquatic vehicle's path. Water-tight detection means is placed on the aquatic vehicle for receiving a series of signals which are induced when the vehicle cuts through the magnetic field produced at a plurality of such buoys. The signals, responsive to the vehicle speed, are amplified and extraneous high frequencies attenuated, and speed or course traverse time calculated and displayed.

17 Claims, 8 Drawing Sheets

1

APPARATUS FOR TIMING AQUATIC CRAFT FOR WATER SKIING COMPETITION

RELATED APPLICATIONS

This application is a continuation-in-part of pending U.S. application Ser. No. 743,220 filed Aug. 9, 1991, now abandoned.

BACKGROUND OF THE INVENTION

The present invention relates generally to measuring the speed and timing of aquatic craft, and more particularly relates to the timing of motor boats in water ski competitions and the like.

In competitive water skiing a motor boat is driven through a course of parallel buoys typically separated by a few feet (See FIG. 1). As is common in the art, there are additional parallel lines of outer buoys located on either external side of the boat's course. A skier must navigate around these outer buoys from side to side, crossing behind a moving boat, in order to circumscribe a plurality of buoys describing an approximately sinusoidal path without falling. As is well known in the art, a constant boat speed allows water skiing participants to compete on an equal basis and concomitant official records to be maintained.

As is also well known in the art, competition ski boat drivers are subject to numerous qualifications and special training to improve their driving skills. Heretofore, the method of maintaining uniform boat speed during water skiing competitions has been to time a boat's passage through its course from the first buoy to the last. At a given boat speed and course length, a boat course traverse time is a constant. Such timing is accomplished by having a person on each boat start a hand-held stopwatch when the boat passes the first buoy and stop the stopwatch when the boat passes the final buoy. Such a methodology, unfortunately, can be subject to substantial variation, primarily due to errors reading the stop-watch on a moving boat.

The accuracy required by the American Water Ski Association (AWSA) for standard tournaments is ±½ mile/hour and for so-called record-capability tournaments is ±¼ mile/hour. Thus, the benefit of having access to an electronic timer should be evident. The accuracy required, however, by the AWSA for such electronic timing is 0.05/100. That is, for every 100 seconds, the measured time may deviate by no more than 0.05 seconds. As is known by those skilled in the art, a typical boat speed for water skiing competition is 36 miles/hour with a concomitant course traverse time of 16.08 seconds.

Thus, heretofore unknown in the prior art is a convenient and safe method and apparatus for conveniently timing the speed of motor boats in water ski competitions and the like. There have been improvements in the prior art relative to devices for detecting the position of moving bodies on land as well as in aqueous environments. For example, Posseme, in U.S. Pat. No. 4,470,013, discloses a device for the dynamic anchoring of a ship to a platform in the open sea. The Posseme device, improving upon certain techniques disclosed in U.S. Pat. No. 4,316,253, positions a ship using an induced magnetic field resulting from two submerged conductors disposed in the platform through which alternating current passes in opposite directions. The moving ship contains magnetometers which measure the instantaneous induced magnetic field. As another example, in U.S. Pat. No. 4,943,772, Manaupu et al disclose a position sensor for detecting the position of railway vehicle axle relative to a rail of track. The Manaupu sensor provides means for producing magnetic field above the rail with lines of force of the field being vertical and perpendicular to the direction of the axle, and means for measuring the value of the component of the magnetic field in the direction of the axle, whereby the distortion of the magnetic field associated with the rail as approached by the axle is observed via hall-effect probes. More particularly, these two hall-effect probes are secured to the axle with their planes being perpendicular to the axles direction and the value of the component of the magnetic field in the direction of the axle being proportional to this separation being detected. As another example, Paesch et al, in U.S. Pat. No. 4,935,697, disclose a method and apparatus for measuring the flight path of projectile be detecting either an electrical charge imported to the projectile by friction with air and/or gas fumes generated during ignition or detonation, via at least one inductively operated sensor. The resulting signal may be used to measure time of flight, velocity, etc. The Paesch sensor is an improvement over optical measuring methods which are susceptible to the vicissitudes of whether and vary with the amount of light available. The magnetic field is generated by moving charge which produces a voltage in the induction coil of the sensor which is responsive to the velocity of the projectile and may actuate other measuring devices. As still another example of developments in the position sensing art, in U.S. Pat. No. 4,788,498 Uemura discloses a magnetic detector for detecting the position necessary for stopping vehicles, e.g., elevators, trains, etc., at predetermined positions without human intervention. Uemura improved magnetic detector comprises a magnetic field generating substance, pairs of linearly aligned saturable coils, a high-frequency oscillator for supplying high-frequency voltage through resistors to each pair of coils, and means for rectifying these voltages across the resistors in a differential manner as output. By combining the Uemura magnetic detector with a differentiating circuit, a velocity detector embodiment may be used.

Accordingly, these limitations and disadvantages of the prior art are overcome with the present invention, and improved means and techniques are provided which are useful for reliably and conveniently detecting and recording the speed of aquatic vehicles through a water ski course, using signals generated by a magnetic field.

SUMMARY OF THE INVENTION

The invention includes floating magnetic field producing means which are preferably placed below or embedded within buoys in a water skiing course and the like through which a aquatic vehicle towing a water skier and the like travels. In accordance with the present invention, disposed on the aquatic vehicle is detecting means for accurately determining the vehicle's speed or course traverse time, by tracking the induced current generated when the vehicle crosses such magnetic field. The detection circuitry includes suitable means for amplifying the induced signal which is responsive to the speed of the aquatic vehicle. Calculation and display means are also provided to visually indicate speed or traverse time.

Accordingly, it is an object of this invention to provide an improved means for determining the start, finish and intermediate times for an aquatic vehicle, such as a motor boat.

It is another object of this invention to provide a device which will record the time of passage through a given course.

It is another object of this invention to provide a timing device which will be relatively unaffected by noise, the action of waves, water depth, and other conditions typical of water based sports.

It is another object of this invention to provide a means which will calculate an aquatic vehicle's speed and display such speed for feedback to aid in the training of motor boat drivers.

It is a specific objects of the present invention, in a water skiing course having an aquatic vehicle towing a water skier, an apparatus for measuring said vehicle's speed or course traverse time, said apparatus comprising: a first plurality of magnetic field producing members; said first plurality of magnetic field producing members disposed adjacent at least one of a first plurality of linearly aligned buoys; a second plurality of magnetic field producing members; said second plurality of magnetic field producing members disposed adjacent at least one of a second plurality of linearly aligned buoys; said first plurality of linearly aligned buoys disposed parallel of said second plurality of linearly aligned buoys and sufficiently spaced apart for accommodating a path of travel of said aquatic vehicle through said water skiing course; a water-tight detection member removably disposed in said aquatic vehicle for receiving a series of electrical signals responsive to said speed of said aquatic vehicle, said series of electrical signals induced when said aquatic vehicle cuts through a magnetic field emanating from at least one of said first plurality of magnetic field producing members and through a magnetic field emanating from at least one of said second plurality of magnetic field producing members; and said detection member comprising circuit means suitable for amplifying said series of signals and simultaneously attenuating high frequency extraneous signals, for accurately recording and displaying said aquatic vehicle's speed or course traverse time.

These and other objects and features of the present invention will become apparent from the following detailed description, wherein references to the figures in the accompanying drawings.

IN THE DRAWINGS

DETAILED DESCRIPTION OF THE BEST MODE

Figure 1:
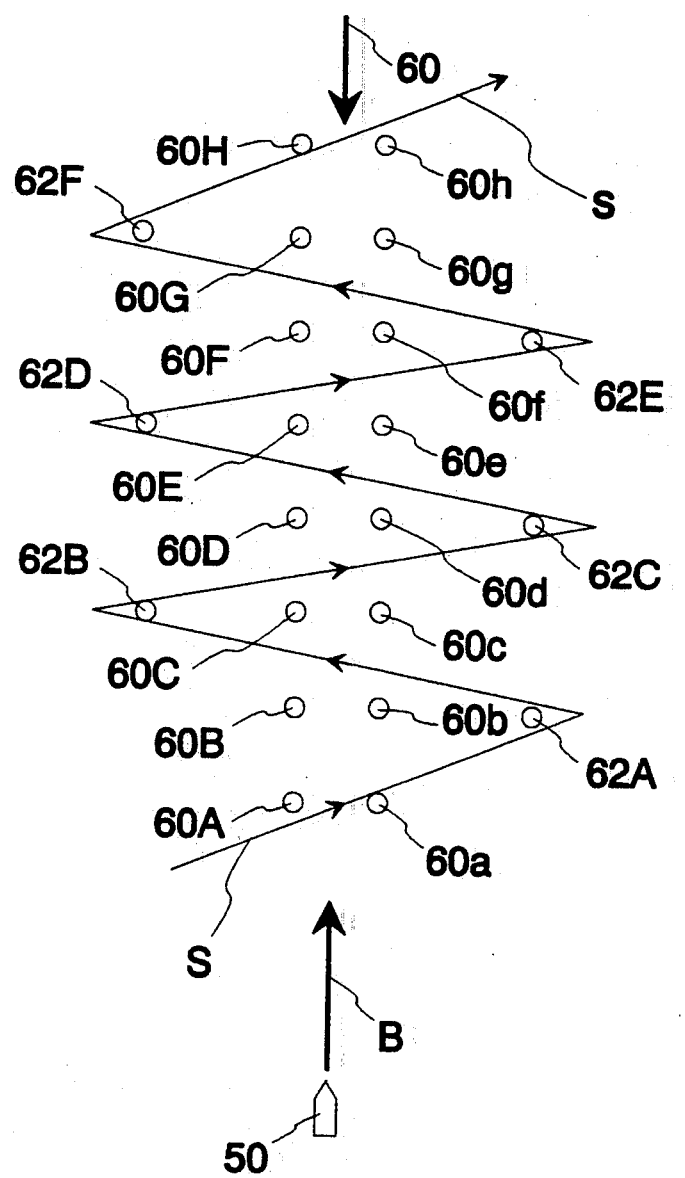
FIG. 1 depicts a typical layout of a water skiing course sanctioned by the American Water Ski Association.

Referring now to the drawings, FIG. 1 shows the layout of a typical competition water skiing course 55 as promulgated by the American Water Ski Association (AWSA) consisting of boat path B and water skier path S. Boat 50 traverses linear path B bounded by plurality of inner buoys 60 A-H and 60 a-h, respectively, from left to right as a skier encircles plurality of outer buoys 62 A-F along sinusoidal path S.

As will be hereinafter described in detail, in accordance with the present invention, as boat 50 proceeds along its linear path B between buoys 60 A-a, 60 B-b, 60 C-c, 60 D-d, 60 E-e, 60 F-f, 60 G-g, and 60 H-h, respectively, receiver 100 (not shown) located on boat 50 cuts through the magnetic force field generated from magnetic material imbedded within plurality of buoys 60, thereby causing a corresponding electrical signal to flow into an operational amplifier contained within receiver 100. More particularly, receiver 100 is preferably positioned on the left side of boat 50 so that as the boat proceeds along path B, receiver 100 is parallel to plurality of buoys 60. This arrangement enables receiver 100 to exhibit an advantageous sensitivity to an induced electrical signal therein over a range of up to three and one-half feet.

Figure 2:
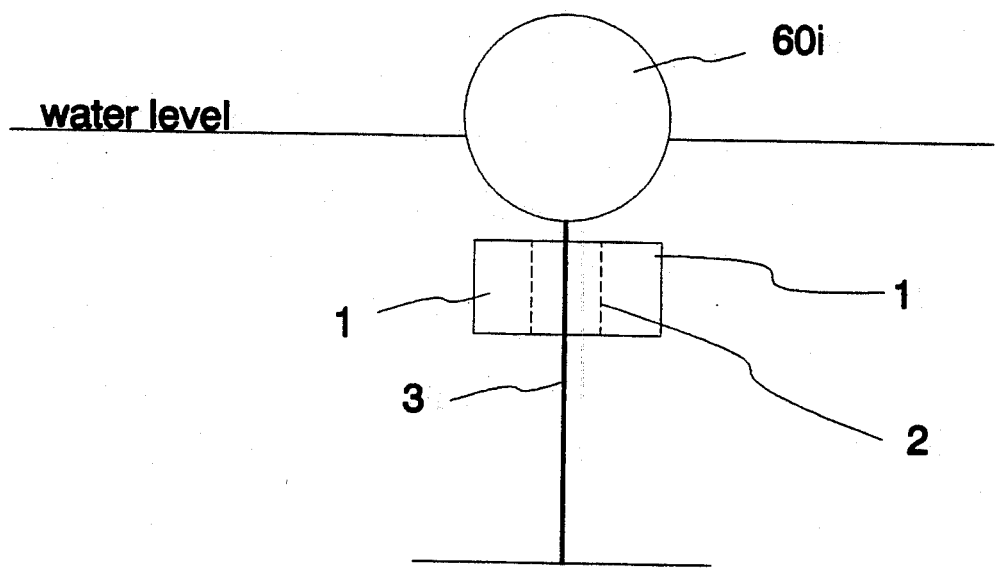
FIG. 2 is a front view of a magnetic-field generating device embodying the present invention, attached to a buoy.
Figure 4A:
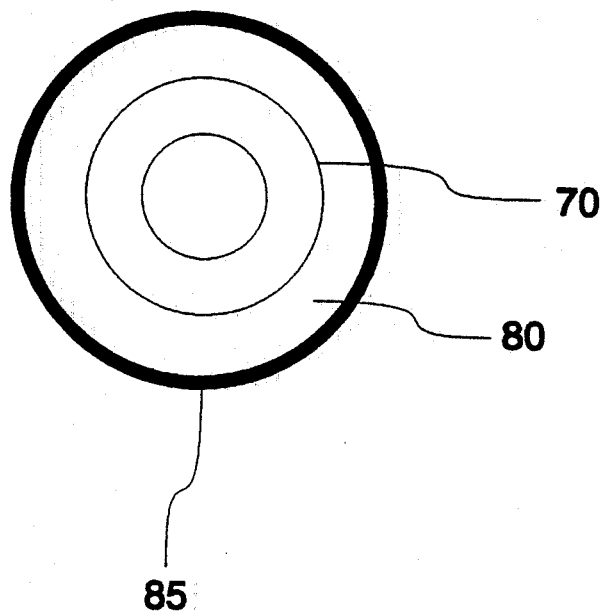
FIG. 4A is an enlarged top view of the magnetic-field generating device shown in FIG. 2.
Figure 4B:
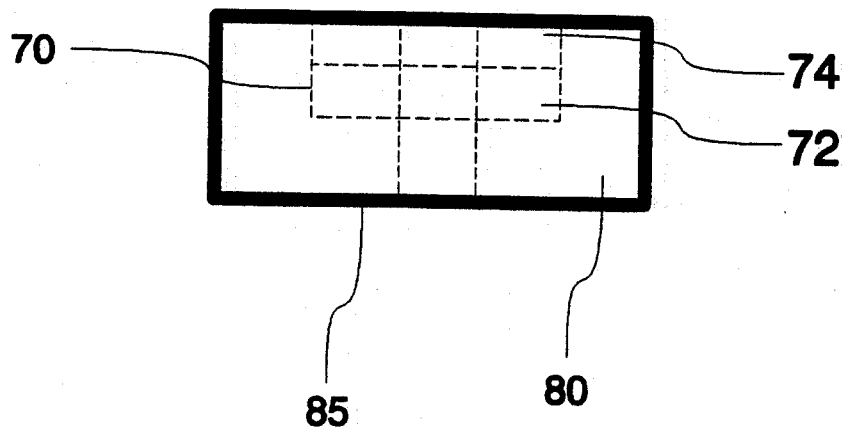
FIG. 4B is an enlarged front view of the device depicted in FIG. 4A.

FIG. 2 is a drawing of a typical magnetic field-producing transmitter 1 embodying the present invention, floating under one of plurality of buoy 60 and centered thereon with conventional bungie cord 3. Bungie cord 3 passes through axial hole 2 in magnetic field-producing transmitter 1 and is secured to the bottom of the body of water. As depicted in FIGS. 4A and 4B, magnetic transmitter 1 comprises concentric layers of magnetic material 70 and floatation material 80, both of which are encased in protective covering 85.

As shown in FIGS. 4A and 4B, floatation is imparted to magnetic field-producing transmitter 1 by encasing magnetic material 70 in a porous material like Ethafoam 80, manufactured by Houston Foam Company. When mounted in Ethafoam, magnetic material 70 will float directly under slalom buoy 60. Under the teachings of the present invention, Ethafoam 80 is dimensioned so as not to interfere with the water skier or the boat. When positioned under a slalom buoy, magnetic field-producing transmitter 1 is approximately 4 to 6 inches below the surface. Protective coating layer 85 preferably comprises Plasti-Dip manufactured by Plastic Dip Inc. to protect magnet material 70 from water invasion and temperature variations, and also to secure them into position. As should be clear to those skilled in the art, such Plasti-Dip material is commonly used to coat tools and the like. Floating transmitter 1 may also be painted with bright colors to aid in location thereof in the water and to diagnose potential security problems and leaks. Such bright-colored identification prevents a driver from inadvertently colliding with floating transmitter 1.

Now referring to FIGS. 2 and 4 A-B, magnetic material 70 preferably comprises two donut-shaped 90 Gauss ceramic magnets 72 and 74, which are stacked one on top of the other. For example, each such magnet may be 3 inches in diameter, 1.125 inches thick and has a 1.125 inch diameter hole in the center. Ceramic magnetics 72 and 74 are commonly available and inexpensive, and are manufactured from strontium ferrite. In accordance with the teachings of the present invention, a pair of such 90 Gauss magnetic improves the magnetic field detection range from approximately 2 feet to 3.5 feet. There is only marginal improvement in detection range accomplished when three magnets are used. Magnets 72 and 74 are press fit into Etha-foam 80, after recesses are cut therein. In accordance with the present invention, floating transmitter 1 is positioned in a polarized manner with the south pole thereof facing upward. As will become clear to those skilled in the art, the polarity of transmitter 1 is important to the overall sensitivity of the present invention.

Figure 3:
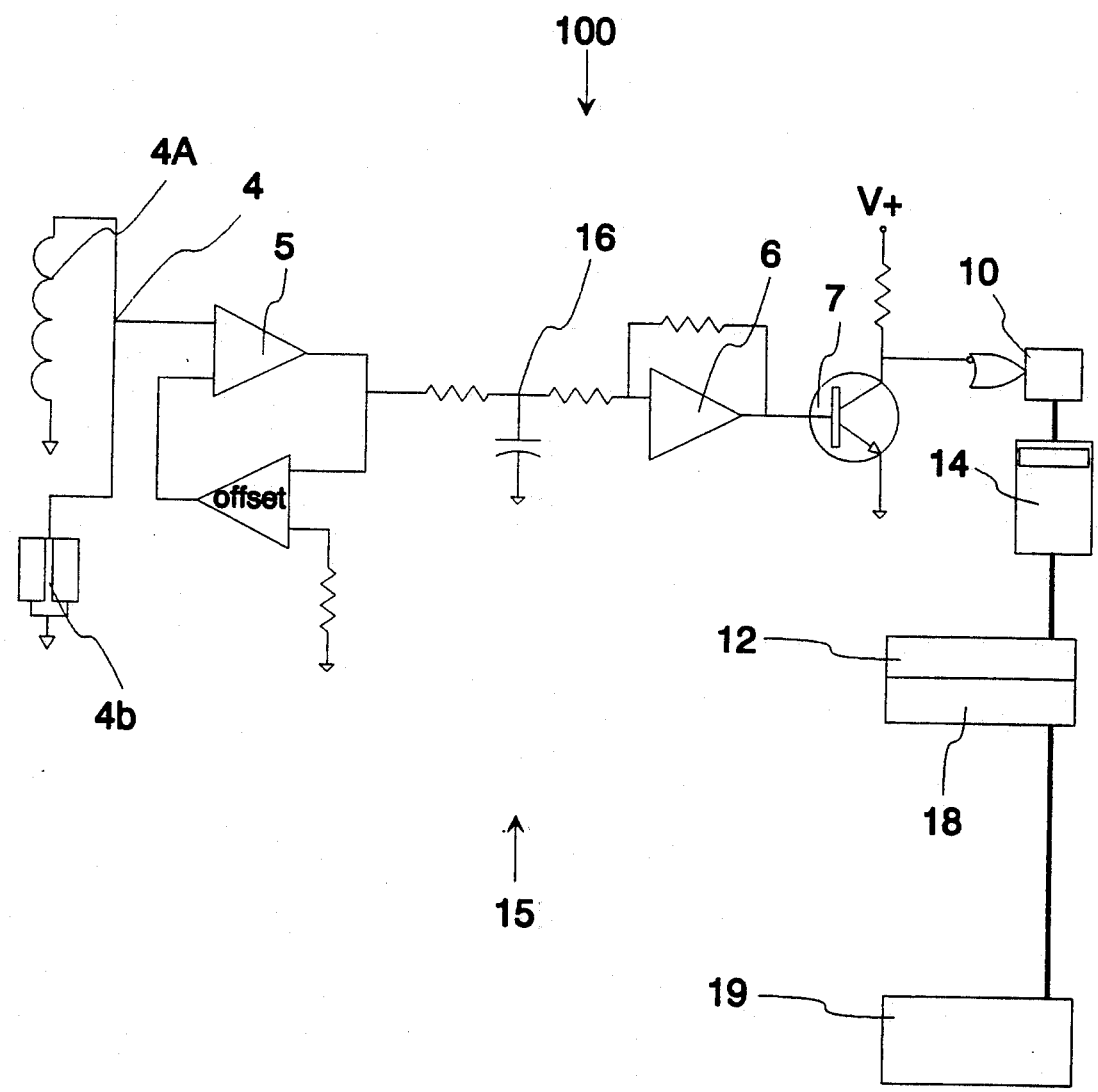
FIG. 3 is a simplified diagram of the detection circuitry embodying the present invention.

FIG. 3 is a simplified schematic diagram of detection and processing means 15 which comprises the present invention. This detection and processing means 15 is preferably situated on left side of boat 50 (not shown) so as to remain in a parallel relationship with its path B through plurality of buoys 60. As should be clear to those skilled in the art, such a parallel configuration promotes both the sensitivity and the sensing range of detecting means 15 regarding current IC. Receiver 4 comprises either coil receiver 4A or Hall-Effect receiver 4B. First considering receiver coil 4A and referring to FIG. 5, it preferably comprises a 2.5 inch diameter coil 20 wound in such a direction as to be more sensitive to the south magnetic pole than to the north. Coil 20 is shielded with copper foil 26 that has been covered on one side with non-conducting material 24, in order to protect the coil from electrical noise from the boat's wiring. Representative non-conducting materials include conventional Teflon tape. In accordance with the present invention, as boat-mounted coil 20 passes through magnetic field generated from a proximal floating magnetic field-producing device, current flow IC is induced in coil 20, which current flow passes to current amplifier 5.

The output of current amplifier 5 is used to remove any DC offset that may appear in current amplifier 5, via a feedback loop. It is then fed to low pass filter 16 and thence to second current amplifier 6. The signal from second amplifier 6 is fed to transistor 7 which functions as an inverter. The positive pulse that is fed to transistor 7 is converted to a negative pulse that will activate conventional timing circuit 10 or microprocessor 12, preferably with an LCD display 18 and optional printer 19. Microcontroller 12 uses this pulse to start the timing sequence that determines tolerances for the course split and end times. In accordance with the present invention, the tolerances for the selected speed are pre-programmed into microcontroller 12. In the times are too slow or too fast, microcontroller 12 compares these values and visually displays the results. If stopwatch 14 is used to manually record course split and end times, then, of course, the operator thereof orally communicates the observed results to the boat's driver for immediate speed adjustments, if necessary.

Figure 8:
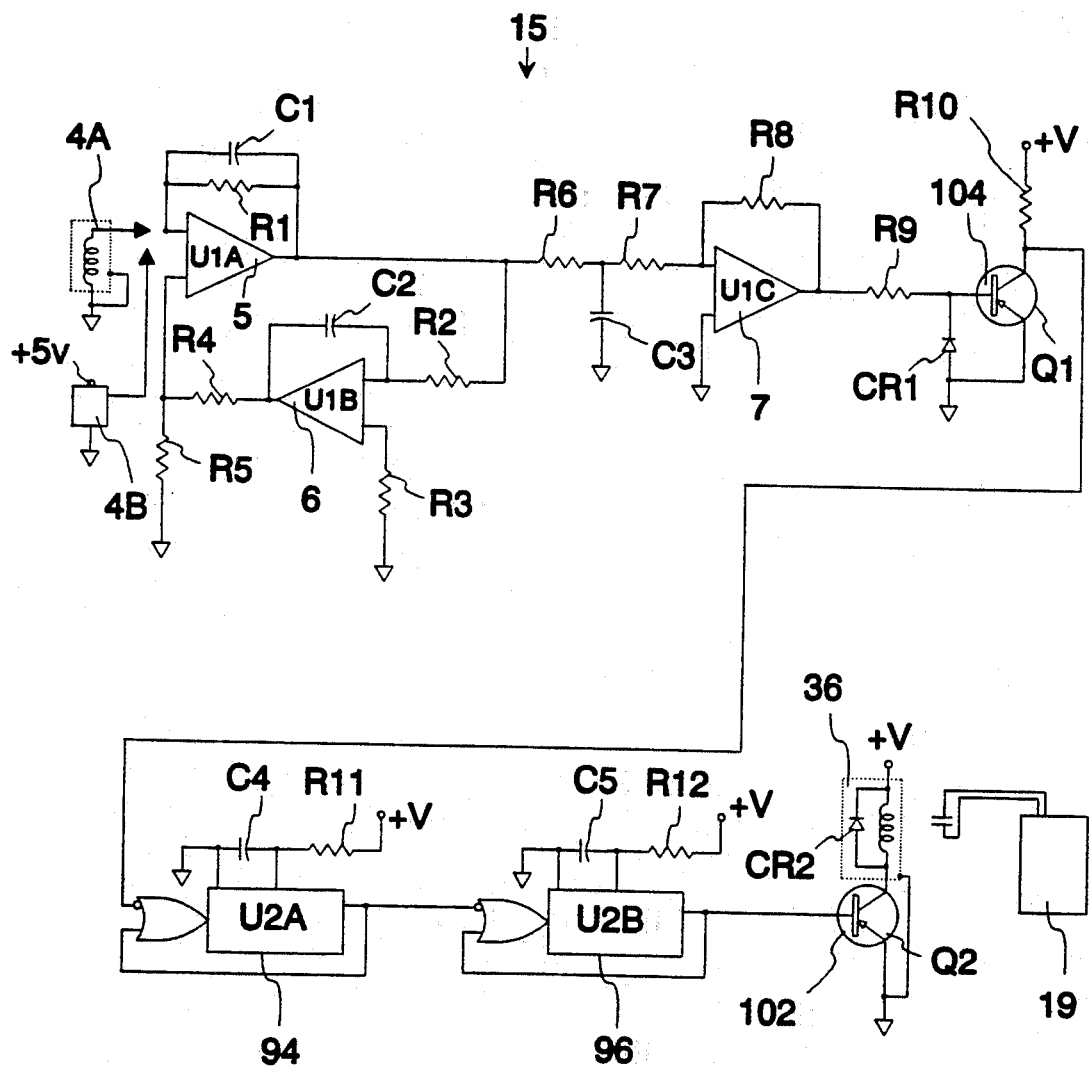
FIG. 8 is a circuit diagram depicting the detection circuitry embodying the present invention.

In accordance with the present invention, at least two methods of front end detection may be used to detect the field of magnetic force. First referring to FIG. 5, there is shown a longitudinal cut-away front view of coil receiver 4A. Circuit board 120 containing the electronics depicted in FIGS. 3 and 8, and upon which amplifiers 5, 6 and 7 and their associated circuitry are mounted. As should be clear to those skilled in the art, component layout on such a circuit board is important because of the presence of a dc-dc converter which is conventionally integrated into the power supply. Accordingly, it should be clearly understood that a circuit board embodying the present invention should be preferably populated to avoid unwanted pulses from entering front end portion 4 of the circuit depicted in FIGS. 3 and 8, which would then cause false triggers to occur. Referring again to FIG. 5, coil 20, amplifiers 5, 6, 7 and rechargeable power source 30 are packaged in vibration absorbing material 40 within a tube which is then sealed with silicone rubber for protection from the elements. Output jacks (not shown) are provided for connection with display and other output devices.

Figure 5:
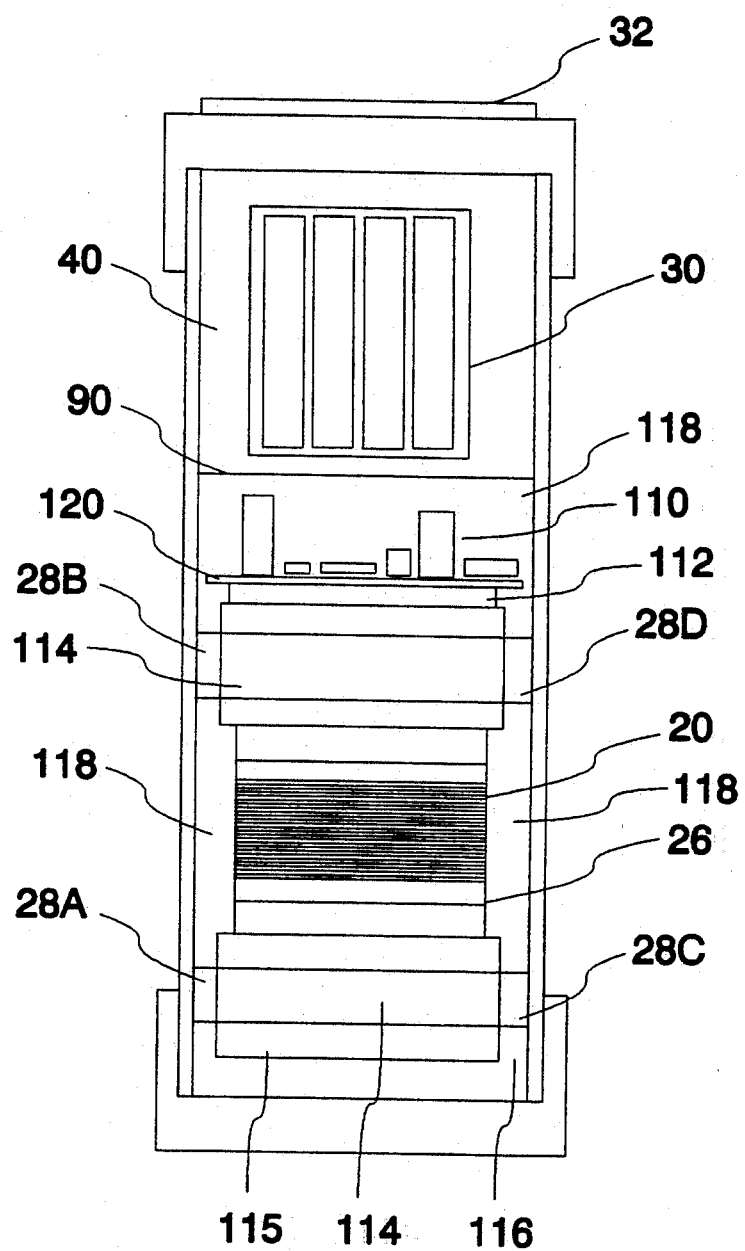
FIG. 5 is a longitudinal cut-away front view of the coil receiver depicted in FIG. 3.

Still referring to FIG. 5, coil 20 is wound around an air core and has a resistance of preferably 12 ohms. Coil 20 is circumscribed by shield 26 and contains ferrite beads on the appropriate wires to reduce noise spikes. As coil 20 cuts through the magnetic force field embodying the present invention, current IC flows therein causing a signal to be induced into operational amplifier 5.

Figure 6:
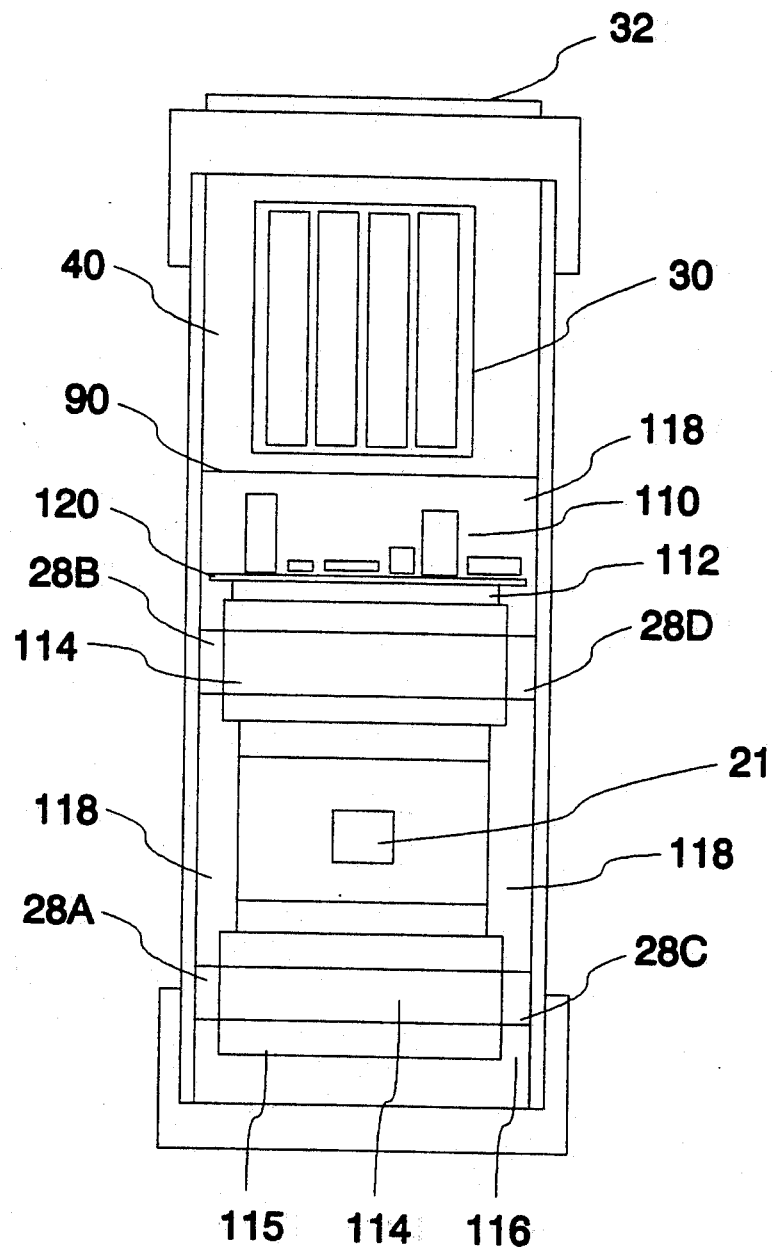
FIG. 6 is a longitudinal cut-away front view of the Hall-Effect receiver depicted in FIG. 3.

An alternative method of detection using a Hall-Effect sensor is depicted in FIG. 6. In particular, as is well known in the art, Hall-Effect sensor 21 is a linear device with 3 terminals and is powered with +5 volts. The output of such a sensor varies as its position changes in relation to the lines of force of the magnetic field. The output of Hall-Effect sensor 21 is directly proportional to the intensity of the magnetic field.

Referring again to FIGS. 3 and 8, there is shown the circuitry embodying preferred embodiments of the present invention. Operational amplifier 5 is a low noise device which operates from a +5 and −5 supply. The output therefrom proceeds to resistance R2 and then to operational amplifier 6. In accordance with the present invention, resistance R2 and capacitance C2 are valued to give a long time constant, thereby causing the output of operational amplifier 6 to be relatively slow-changing. This signal is then fed into the non-inverting input of amplifier 5 which will cause any DC offset therein to be nulled out. The output from amplifier 5 is then fed into resistance R6. Resistances R6, R7, R8, capacitance C2, and operational amplifier 7 form a low pass 60 Hz filter with gain. As is well known to those skilled in the art, this portion of the circuitry is used to attenuate any high frequency signal that may have been generated by vibration or movement of detector receiver 15 on the boat 50. It then amplifies the lower frequency pulse that was generated from the magnetic force field. The pulse is then fed into transistor 104 which functions as an inverted: the signal is inverted and shaped into a negative-going pulse.

The negative going pulse is then fed into the inverting input of one-shot mono-stable multi-vibrator 94. The output of mono-stable multi-vibrator 94, which is a positive pulse, is then fed into the inverting input of one-shot mono-stable multi-vibrator 96. In accordance with the present invention, resistance R12 and capacitance C5 are valued to give a relatively long timing pulse out of multi-vibrator 96. This pulse is fed to transistor 102 and back to the non-inverting input of multi-vibrator 96. In accordance with the teachings of the present invention, this is done to insure that multi-vibrator 96 will not be retriggered during the duration of the timing pulse. Transistor 102 functions as a switch. When switch 102 is turned "on" it allows relay coil 36 to be energized. The normally open contacts of relay coil 36 are then closed, and activate timing and display function that embody the present invention. The display and timing is accomplished by using a timing circuit 10 or stopwatch 14 or microcontroller 18 that has been programmed with the appropriate boat speeds and corresponding times for tournament use. The output of microcontroller 18 can also be entered to printer 19 to provide a report of each run with its corresponding times.

Referring again to FIGS. 5 and 6, alternative receivers 4A and 4B are preferably contained in a poly-vinyl chloride (PVC) tube. Internal parts that hold the sensor, either pick-up coil 20 or Hall-Effect device 21, and electronics circuit board 120 are also PVC. In accordance with the preferred embodiment of the present invention, circuit board 120 is secured to sensor support 115 with a thin layer of high quality electronic grade of silicone rubber 112. Sensor support 115 is mounted and secured with single sided silicone foam tape 114. End 116 of sensor support 115 is also secured in place with silicone rubber to prevent any lateral movement thereof.

Bulkhead 90 is used to separate sensor support 115 and electronics 110 from power source 30. A hole (not shown) is located in the center of bulkhead 90 to enable a wire to pass therethrough. In one embodiment of the present invention, the power source is a set of 8 rechargeable nicad batteries. When fully charged (10 to 12 hours) the voltage supply will last approximately 45 hours. The power pack is preferably secured in place with Ethafoam 80 to prevent any movement and vibration. Control plate 32 contains an on-off switch, a charging jack, and a 4-pin phone jack for interconnecting with display units (not shown).

Figure 7:
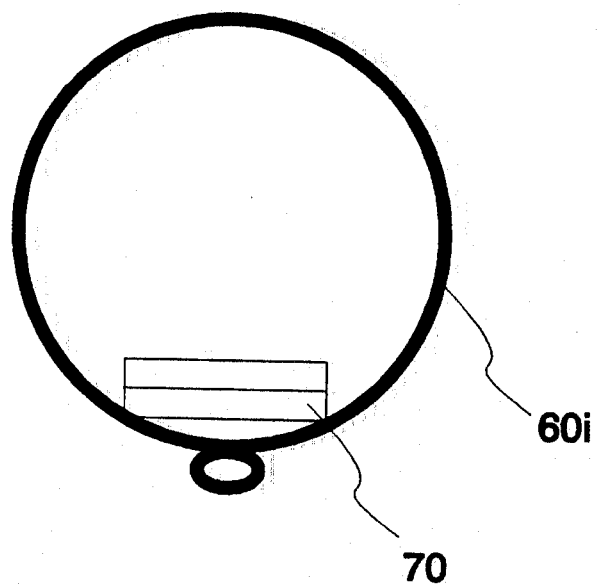
FIG. 7 is a front view of an alternative embodiment of the magnetic-field producing device of the present invention.

As an alternate embodiment of the present invention, magnetic transmitter 1 may be made an integral part of plurality of buoys 60. Referring to FIG. 7, magnetic material 70 is incorporated into buoy 60$i$. This, of course, simplifies installation of the present invention and provides added protection to the magnetics contained therein.

To enjoy the benefits afforded by the present invention, referring for convenience to FIG. 1, transmitters are preferably placed on each of starting buoys 60 A-$a$ and ending buoys 60 H-$h$, on buoy 60 D, which is located ⅓ the distance into the boat's path B from the left of the course, and on buoy 60 M, which is similarly located ⅓ the distance into the boat's path B from the right. The preferred embodiment of the present invention has been calibrated to a tolerance of 0.001/100 which, of course, significantly exceeds the AWSA 0.05/100 requirement. Indeed, a transmitter may be placed on every buoy for more precise timing. In this transmitter configuration, it is even practicable for a driver to traverse a water skiing course by observing an on-boat display instead of the speedometer. Thus, the course could be routinely and reliably traversed based upon time instead of speed. The present invention can also be used for timing water skiing jump courses and courses related to sail boats, water bikes or other aquatic craft.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to be measured by the appended claims herein.

I claim:

1. In a water skiing course having an aquatic vehicle towing a water skier, an apparatus for measuring said vehicle's speed or course traverse time, said apparatus comprising:

a first plurality of magnetic field producing members;

said first plurality of magnetic field producing members disposed adjacent at least one of a first plurality of linearly aligned buoys;

a second plurality of magnetic field producing members;

said second plurality of magnetic field producing members disposed adjacent at least one of a second plurality of linearly aligned buoys;

said first plurality of linearly aligned buoys disposed parallel of said second plurality of linearly aligned buoys and sufficiently spaced apart for accommodating a path of travel of said aquatic vehicle through said water skiing course; and a water-tight detection member removably disposed in said aquatic vehicle for receiving a series of electrical signals responsive to said speed of said aquatic vehicle, said series of electrical signals induced when said aquatic vehicle cuts through a magnetic field emanating from at least one of said first plurality of magnetic field producing members and through a magnetic field emanating from at least one of said second plurality of magnetic field producing members.

2. The apparatus recited in claim 1, wherein at least one of said first plurality of magnetic field producing members is releasably and floatably attached to one of said first plurality of linearly aligned buoys.

3. The apparatus recited in claim 1, wherein each of said first plurality of magnetic field producing members comprises a first plurality of magnets securably and sealably contained therein.

4. The apparatus recited in claim 3, wherein each of said first plurality of magnets are congruent and disposed in a stacked relationship with respect to each other.

5. The apparatus recited in claim 1, wherein at least one of said second plurality of magnetic field producing members is releasably and floatably attached to one of said second plurality of linearly aligned buoys.

6. The apparatus recited in claim 1, wherein each of said first plurality of magnetic field producing members comprises a first plurality of magnets securably and sealably contained therein.

7. The apparatus recited in claim 6, wherein each of said second plurality of magnets are congruent and disposed in a stacked relationship with respect to each other.

8. The apparatus recited in claim 1, wherein said detection member is disposed on said boat substantially parallel to said first plurality of linearly aligned buoys.

9. The apparatus recited in claim 1, wherein said detection member comprises circuit means suitable for amplifying said series of signals and simultaneously attenuating high frequency extraneous signals, for accurately recording and displaying said aquatic vehicle's speed or course traverse time.

10. In a water skiing course having an aquatic vehicle towing a water skier, an apparatus for measuring said vehicle's speed or course traverse time, said apparatus comprising:

a first plurality of magnetic field producing members;

said first plurality of magnetic field producing members imbedded within at least one of a first plurality of linearly aligned buoys;

a second plurality of magnetic field producing members;

said second plurality of magnetic field producing members imbedded within at least one of a second plurality of linearly aligned buoys;

said first plurality of linearly aligned buoys disposed parallel of said second plurality of linearly aligned buoys and sufficiently spaced apart for accommodating a path of travel of said aquatic vehicle through said water skiing course; and a water-tight detection member disposed on said aquatic vehicle for receiving a series of electrical signals responsive to said speed of said aquatic vehicle, said series of electrical signals induced when said aquatic vehicle cuts through a magnetic field emanating from at least one of said first plurality of magnetic field producing members and through a magnetic field emanating from at least one of said second plurality of magnetic field producing members.

11. The apparatus recited in claim 10, wherein each of said first plurality of magnetic field producing members comprises a first plurality of magnets securably and sealably contained therein.

12. The apparatus recited in claim 11, wherein each of said first plurality of magnets are congruent and disposed in a stacked relationship with respect to each other.

13. The apparatus recited in claim 10, wherein each of said first plurality of magnetic field producing members comprises a first plurality of magnets securably and sealably contained therein.

14. The apparatus recited in claim 13, wherein each of said second plurality of magnets are congruent and disposed in a stacked relationship with respect to each other.

15. The apparatus recited in claim 10, wherein said detection member is disposed on said boat substantially parallel to said first plurality of linearly aligned buoys.

16. The apparatus recited in claim 10, wherein said detection member comprises circuit means suitable for amplifying said series of signals and simultaneously attenuating high frequency extraneous signals, for accurately recording and displaying said aquatic vehicle's speed or course traverse time.

17. In a water skiing course having an aquatic vehicle towing a water skier, an apparatus for measuring said vehicle's speed or course traverse time, said apparatus comprising:

a first plurality of magnetic field producing members;

said first plurality of magnetic field producing members disposed adjacent at least one of a first plurality of linearly aligned buoys;

a second plurality of magnetic field producing members;

said second plurality of magnetic field producing members disposed adjacent at least one of a second plurality of linearly aligned buoys;

said first plurality of linearly aligned buoys disposed parallel of said second plurality of linearly aligned buoys and sufficiently spaced apart for accommodating a path of travel of said aquatic vehicle through said water skiing course;

a water-tight detection member removably disposed in said aquatic vehicle for receiving a series of electrical signals responsive to said speed of said aquatic vehicle, said series of electrical signals induced when said aquatic vehicle cuts through a magnetic field emanating from at least one of said first plurality of magnetic field producing members and through a magnetic field emanating from at least one of said second plurality of magnetic field producing members; and said detection member comprising circuit means suitable for amplifying said series of signals and simultaneously attenuating high frequency extraneous signals, for accurately recording and displaying said aquatic vehicle's speed or course traverse time.

* * * * *